(12) United States Patent
Krishnamurthy

(10) Patent No.: US 8,345,847 B2
(45) Date of Patent: Jan. 1, 2013

(54) SYSTEM AND METHOD FOR CALL HIBERNATION

(75) Inventor: Sriram Munjurpattu Krishnamurthy, Karnataka (IN)

(73) Assignee: Alcatel Lucent, Paris (FR)

( * ) Notice: Subject to any disclaimer, the term of this patent is extended or adjusted under 35 U.S.C. 154(b) by 1619 days.

(21) Appl. No.: 11/802,892

(22) Filed: May 25, 2007

(65) Prior Publication Data

US 2008/0292076 A1 Nov. 27, 2008

(51) Int. Cl.
*H04M 3/42* (2006.01)
(52) U.S. Cl. ............... 379/201.01; 379/210.01
(58) Field of Classification Search .......... 379/201, 379/265, 201.01, 210.1
See application file for complete search history.

(56) References Cited

U.S. PATENT DOCUMENTS

| | | | | |
|---|---|---|---|---|
| 6,141,328 A | * | 10/2000 | Nabkel et al. | 370/259 |
| 7,145,997 B2 | * | 12/2006 | Poikselka et al. | 379/210.01 |
| 2008/0151870 A1 | * | 6/2008 | Stucker et al. | 370/352 |

* cited by examiner

*Primary Examiner* — Curtis Kuntz
*Assistant Examiner* — Amal Zenati
(74) *Attorney, Agent, or Firm* — Harness, Dickey & Pierce, P.L.C.

(57) ABSTRACT

A call hibernation method may include releasing resources allocated to a first call between a calling party and a called party in response to a hibernate message from the called party. The hibernate message may indicate to hibernate the first call, and/or the hibernate message may include reestablishment information for reestablishing communication between the calling party and the called party. A second call may be established between the calling party and the called party in response to a deactivate-hibernated message from the called party. The deactivate-hibernated message may indicate the called party desires to reestablish communication with the calling party, and/or the deactivate-hibernated message may include at least a portion of the reestablishment information.

20 Claims, 4 Drawing Sheets

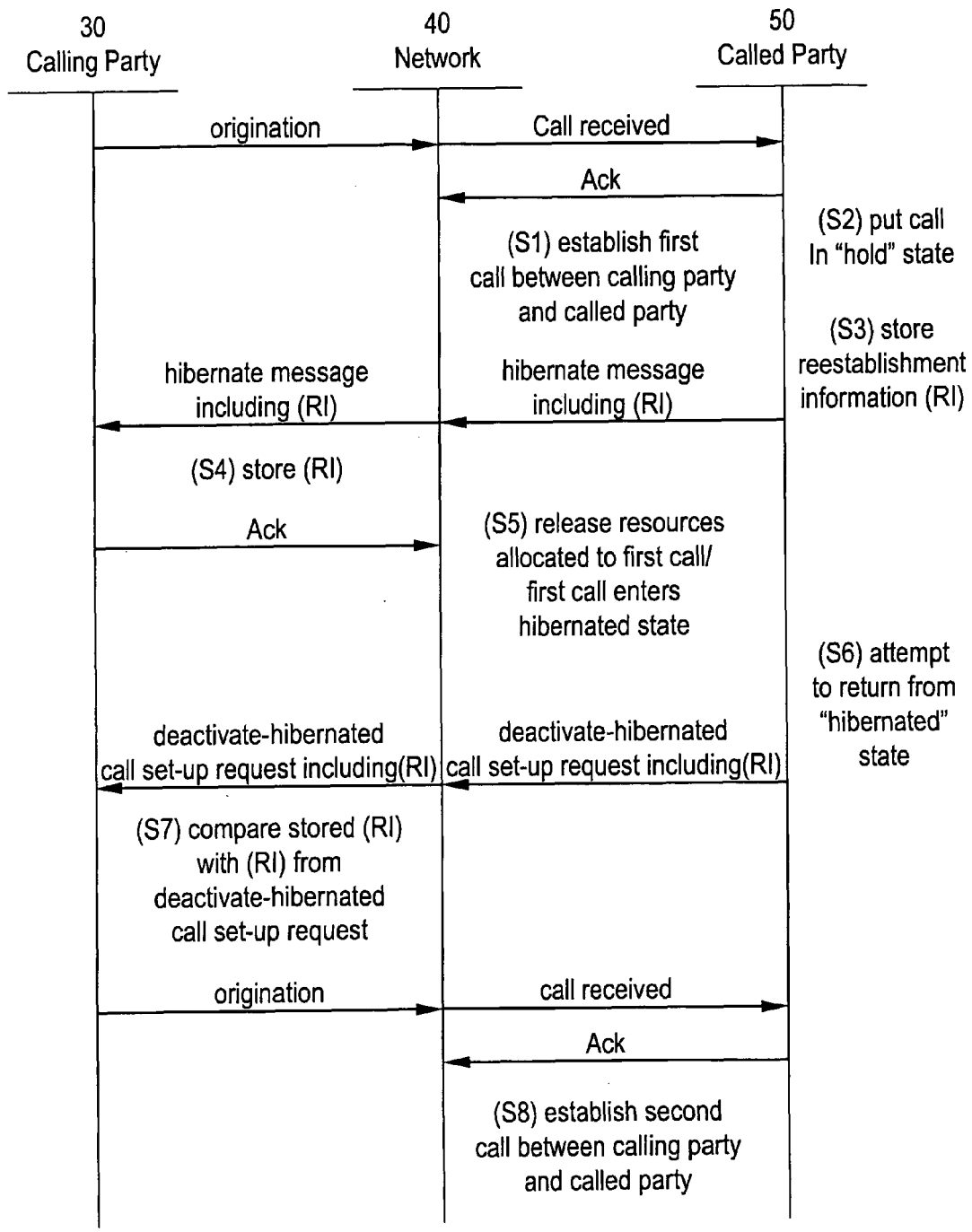

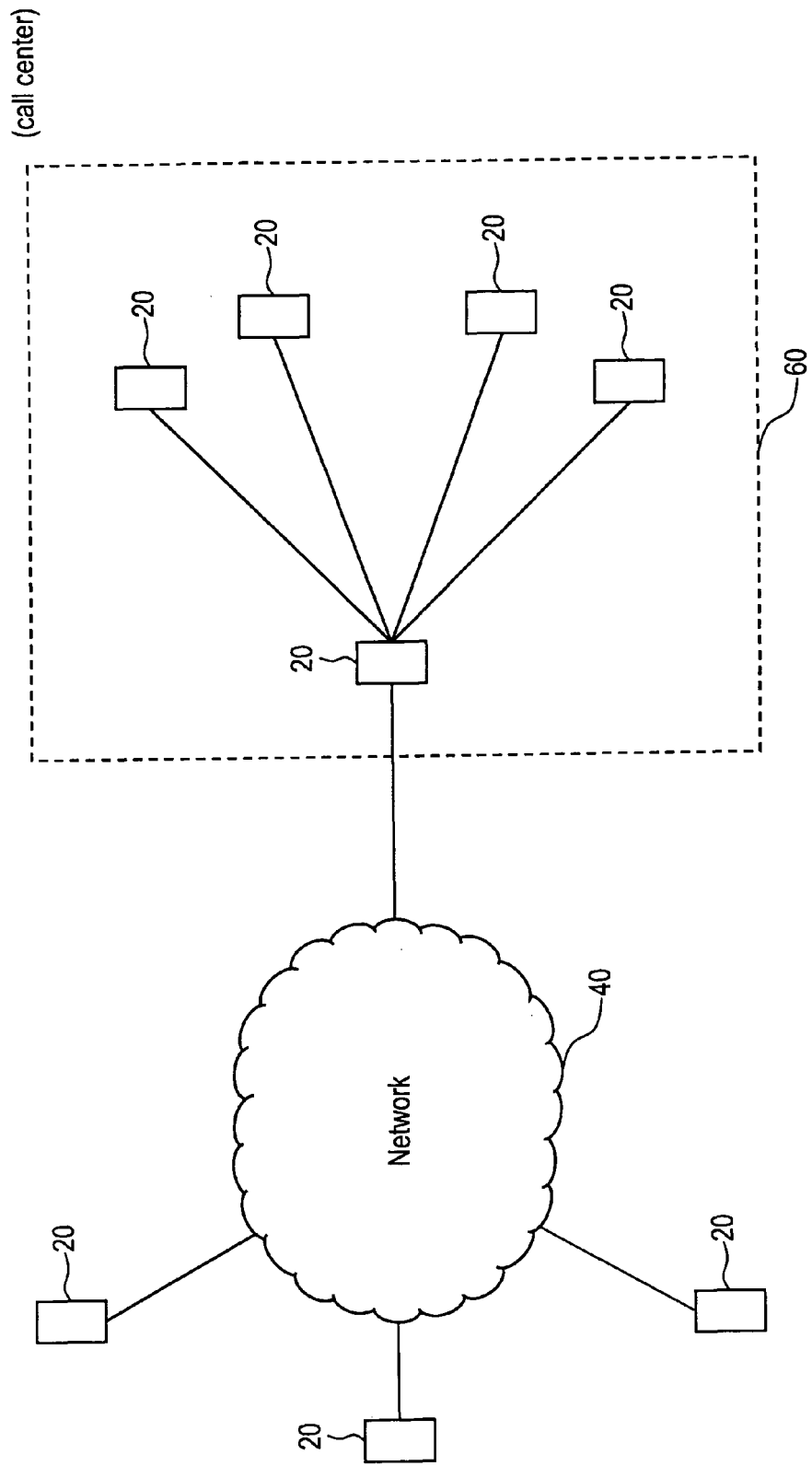

SYSTEM AND METHOD FOR CALL HIBERNATION

BACKGROUND

1. Field

Example embodiments are related to a system and/or method for telecommunication, and for example, to a system and/or method for hibernating a call.

2. Background

In conventional telecommunication systems a call between a calling party and a called party may be put on hold. For example, the call may be placed in a hold state by one of the parties to the call by selecting a call hold option on a communication device. Alternatively, one of the parties to the call may receive a second call and switch to the second call, thereby putting the first call in a hold state.

For example, with the increase of phone services and call centers that are setup for support purposes by various establishments and businesses, it is now possible to get various services over a communication device. However, calls placed to phone services and call centers may often be placed on hold. For example, the called party at the call center may place the call on hold and perform other tasks.

The hold state is a state in which resources allocated to the call are maintained by a network, but in which there is no communication between the calling party and the called party. The hold state may last for any period of time. Wastage of airtime, resources, and money may occur because resources allocated to the call are maintained during the period of time the call is in a hold state. For example, the calling party is charged for the time the call is in the hold state because the network maintains the resources allocated to the call during the hold state. Because the resources allocated to the call are maintained even though they are not being utilized for communication between the calling party and the called party, the network is using resources that may be more efficiently utilized for other operations and/or calls.

SUMMARY

Example embodiments may provide a system and/or method for hibernating a call in which resources allocated to the call are not maintained during a hibernation period of the call.

According to an example embodiment, a call hibernation method for a network may include releasing resources allocated to a first call between a calling party and a called party in response to a hibernate message from the called party. The hibernate message may indicate to hibernate the first call, and/or the hibernate message may include reestablishment information for reestablishing communication between the calling party and the called party. A second call may be established between the calling party and the called party in response to a deactivate-hibernated message from the called party. The deactivate-hibernated message may indicate the called party desires to reestablish communication with the calling party, and/or the deactivate-hibernated message may include at least a portion of the reestablishment information.

According to an example embodiment, a call hibernation method for a calling party may include sending a first acknowledgement response to a network in response to a hibernate message. The hibernate message may indicate to hibernate the first call, and/or the hibernate message may include reestablishment information for reestablishing communication with the called party. A call origination message may be sent to the network in response to a deactivate-hibernated message to establish a second call with the called party. The deactivate-hibernated message may indicate the called party desires to reestablish communication, and/or the deactivate-hibernated message may include at least a portion of the reestablishment information.

According to an example embodiment, a call hibernation method for a called party may include sending a hibernate message to a calling party to release resources allocated by a network to a first call with the calling party. The hibernate message may indicate to hibernate the first call, and/or the hibernate message may include reestablishment information for reestablishing communication with the calling party. A deactivate-hibernated message may be sent to the calling party to establish a second call with the calling party. The deactivate-hibernated message may indicate a desire to reestablish communication with the calling party, and/or the deactivate-hibernated message may include at least a portion of the reestablishment information.

BRIEF DESCRIPTION OF THE DRAWINGS

The above and/or other aspects and advantages will become more apparent and more readily appreciated from the following detailed description of example embodiments taken in conjunction with the accompanying drawings of which:

FIG. 3 is a communication flow diagram of a call hibernation method according to an example embodiment; and FIG. 4 is a block diagram of an example call center in a telecommunication system according to an example embodiment.

DETAILED DESCRIPTION OF EXAMPLE EMBODIMENTS

Figure 1:
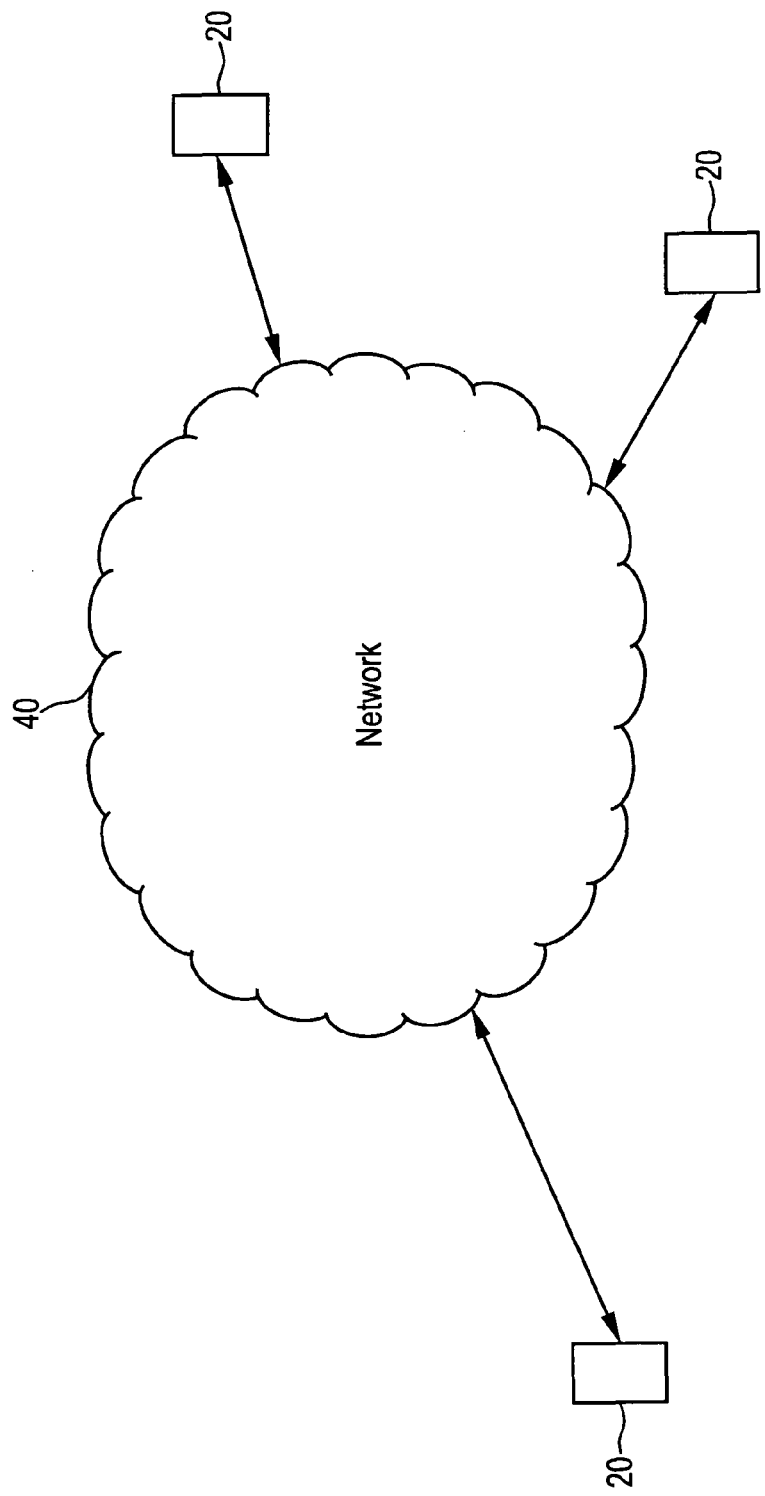
FIG. 1 is a block diagram of an example telecommunication system for implementing an example embodiment.

Example embodiments will now be described more fully hereinafter with reference to the accompanying drawings. Embodiments may, however, be in many different forms and should not be construed as being limited to the example embodiments set forth herein. Rather, these example embodiments are provided so that this disclosure will be thorough and complete, and will fully convey the scope to those skilled in the art.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the example embodiments.

The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Reference will now be made to example embodiments, which are illustrated in the accompanying drawings, wherein like reference numerals refer to the like components throughout.

FIG. 1 is a block diagram of an example telecommunication system suitable for implementing a method for hibernating a call in which resources allocated to the call may be released by a network.

Referring to FIG. 1, a telecommunication system 100 may include a network 40 coupled between a plurality of communication devices 20. The network 40 may be a wireless network, a landline network, or a combination thereof. For example, the network 40 may be a GSM, CDMA, TDMA, OFDMA, Ad Hoc, Bluetooth, 802.11a/b/g, 802.16d/e, DSL, ISDN, and/or PTSN network. However, it is noted that various types of "networks" fall within the scope of example embodiments.

Figure 2:
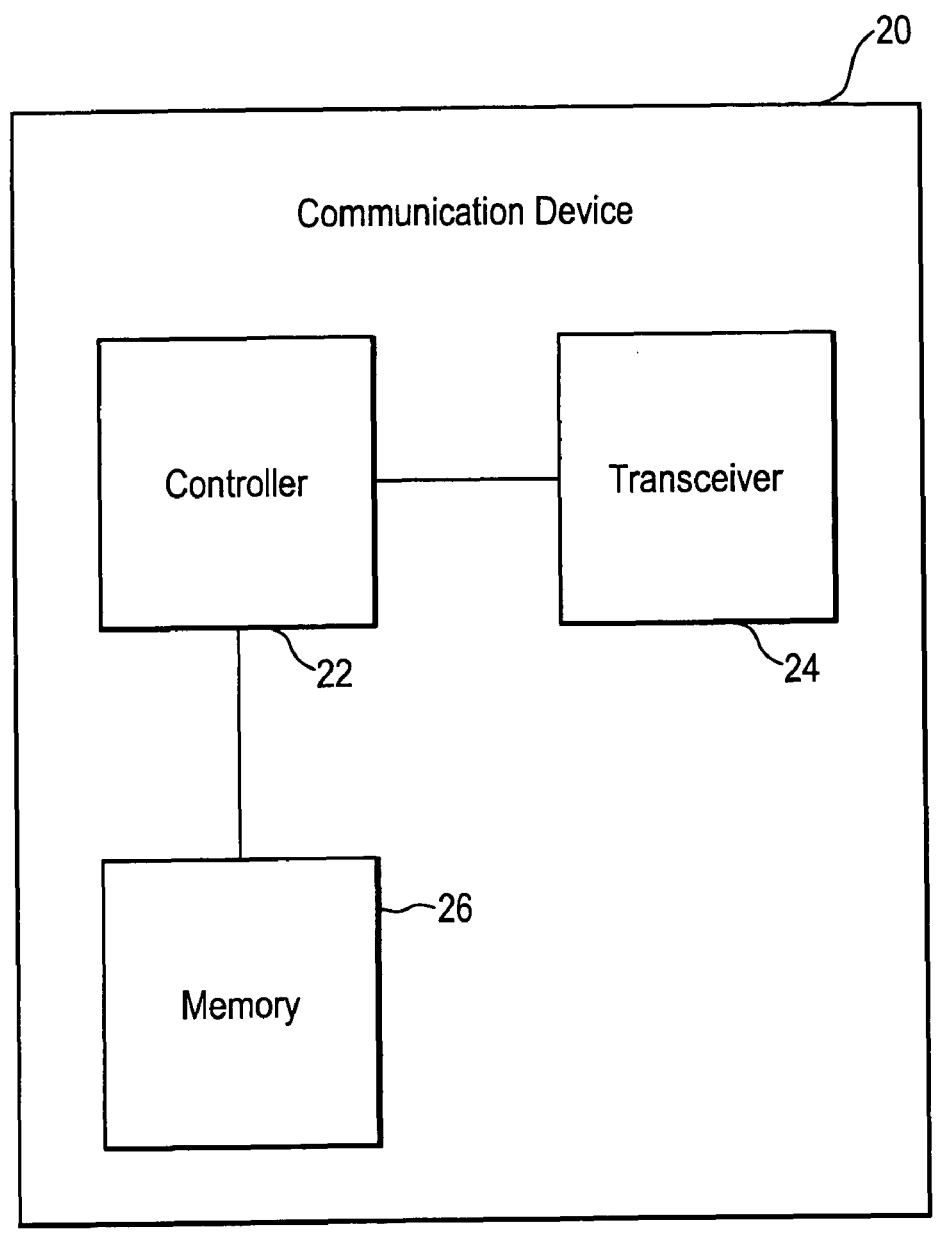
FIG. 2 is a block diagram of an example communication device used in the telecommunication system of FIG. 1.

FIG. 2 is a block diagram of an example communication device 20 used in the telecommunication system 100 of FIG. 1.

Referring to FIG. 2, the communication devices 20 may be phone terminals, for example wireless mobile terminals and/or landline terminals. The communication devices 20 may include a controller 22, a transceiver 24, and/or a memory 26. The memory 26 may include a short term memory, e.g., RAM, and/or a long term memory, e.g., ROM. The controller 22 may control functions of the memory 26 and/or the transceiver 24. The transceiver 24 may be configured to send and receive signals. However, it is noted that various types of "communication devices" fall within the scope of example embodiments.

FIG. 3 is a communication flow diagram of a call hibernation method according to an example embodiment.

Referring to FIG. 3, a calling party 30 and a called party 50 may each communicate with the network 40 through use of the communication devices 20. The calling party 30 may call the called party 50 and send a call origination message to the network 40. The network 40 may receive the call origination message from the calling party 30 and send a call received message to the called party 50. The called party 50 may send an acknowledgement response ACK to the network 40 to indicate acceptance of the call. If the network 40 receives the acknowledgement response ACK from the called party 50, the network 40 may establish a first call between the calling party 30 and the called party 50 (S1). For example, calls may be established by the network 40 using circuit communications and/or data packet communications.

At a time during the first call the called party 50 may place the call into the hold state (S2). For example, a hold option on the communication device 20 of the called party 50 may be selected. On the other hand, the called party 50 may receive another call received message from the network 40, and the called party 50 may flash to the other call, thereby putting the first call in the hold state.

The called party 50 may prepare reestablishment information for the first call. For example, the called party 50 may prepare the reestablishment information in response to the first call being placed in a hold state. Alternatively, the called party 50 may prepare the reestablishment information anytime after the first call is established. The reestablishment information may include a key. The key may be a unique identifier of the communication device 20 of the called party 50. For example, the key may be a unique telephone number of the called party 50. The reestablishment information may also include information about the first call, for example a time at which the first call was received and/or a time at which the first call was placed in a hold state, and/or information that the network 40 may use for billing purposes.

The reestablishment information may be stored in the memory 26 of the communication device 20 of the called party 50, and/or the called party 50 may send a hibernate message to the network 40 including the reestablishment information (S3). The hibernate message may include an identifier, for example in a header, identifying the message as a hibernate message. A hibernate message indicates to hibernate the first call. In one embodiment, the called party 50 may store the reestablishment information and send the hibernate message including the reestablishment information after the expiration of a timer having a desired, or alternatively, a predetermined time. The reestablishment information included in the hibernate message may include only the key or may include the key and additional reestablishment information. Accordingly, if the first call is in the hold state for a relatively short period of time the called party 50 need not store the reestablishment information and send the hibernate message including the reestablishment information.

The network 40 may receive the hibernate message including the reestablishment information, and/or the network 40 may send the hibernate message including the reestablishment information to the calling party 30. The calling party 30 may receive the hibernate message including the reestablishment information. In response to the hibernate message, the reestablishment information may be stored in the memory 26 of the communication device 20 of the calling party 30 (S4), and/or the calling party 30 may send an acknowledgement response ACK to the network 40 indicating receipt of the hibernate message including the reestablishment information.

Although in example embodiments described above the called party 50 may send the reestablishment information in a hibernate message, example embodiments are not limited thereto. Alternatively, the called party 50 may send the reestablishment information to the network 40 immediately after the network 40 establishes the first call and/or immediately after the first call is transferred to a transfer party, e.g., a new called party. The network 40 may send the reestablishment information to the calling party 30, and/or the reestablishment information may be stored in the memory 26 of communication device 20 of the calling party 30. In a case where the call is transferred a transfer party, the called party 50 may include the reestablishment information in information corresponding to the first call that may be sent to the transfer party during the transfer. Accordingly, if a call is dropped before a hibernate message is sent, the calling party 30 may already have received and/or stored the reestablishment information.

The network 40 may release resources (e.g., some or all resources) allocated to the first call in response to the acknowledgement response ACK from the calling party 30 indicating receipt of the hibernate message (S5). For example the network may release circuit paths, data packet paths, memory, and/or processing time allocated to the first call.

Accordingly, the first call may be put in a hibernated state. For example, there may be no communication between the calling party 30 and the called party 50 with respect to the first call and no resources may be allocated to the first call between the calling party 30 and the called party 50, however, the reestablishment information may be stored in both of the communication devices 20 of the calling party 30 and the called party 50. Both the calling party 30 and the called party 50 may be free to perform other operations and/or receive/make other calls if the first call is in the hibernated state. Accordingly, the network 40 may not bill the calling party 30 and/or the called party 50 for any time and/or resources associated with the first call after the first call is put in the hibernated state.

At a time after the network 40 has released resources allocated to the first call, the called party 50 may attempt to reestablish the first call with the calling party 30. For example, an option on the communication device 20 of the called party 50 may be selected to return the first call from the hold state or the called party 50 may flash back from another call to the first call (S6).

However, because resources allocated to the first call may be dropped in response to the hibernate message, the first call may no longer exist. Therefore, the called party 50 may send a deactivate-hibernated message including the reestablishment information to the network 40 in response to the attempt to take the first call off of hold. The activate-hibernated message may include an identifier, for example in a header, identifying the message as an activate-hibernated message. An activate-hibernated message indicates the called party desires to reestablish communication with the calling party. The reestablishment information in the deactivate-hibernated message may include only the key or may include the key and any additional reestablishment information included in the hibernate message. The network 40 may send the deactivate-hibernated message to the calling party 30.

The calling party 30 may receive the deactivate-hibernated message from the network 40. If the calling party 30 accepts the deactivate-hibernated message, a key included in the reestablishment information included in the deactivate-hibernated message may be compared with the key included in the reestablishment information previously stored in the memory 26 of the communication device 20 of the calling party 30 (S7). If the key included in the reestablishment information included in the deactivate-hibernated message matches the key included in the previously stored reestablishment information the calling party 30 may send a call origination message to the network 40. The network 40 may receive the call origination message from the calling party 30, and the network 40 may send a call received message to the called party 50. The called party 50 may receive the call received message from the network 40. The called party 50 may send an acknowledgement response ACK to the network 40 in response to the call received message, and the network 40 may establish a second call between the calling party 30 and the called party 50 in response to the acknowledgement response ACK received from the called party 50 (S8).

Because the network 40 may receive the call origination message from the calling party 30 if the key information is matching, the network 40 may bill the appropriate party or parties for a time of the second call. Accordingly, the called party 50 need not be charged for the second call with the calling party 30, if the calling party 30 was the originator of the first call, even though the called party 50 sends the deactivate-hibernated message.

If the network 40 does not receive an acknowledgement response ACK from the called party 50 in response to the call received message after a desired, or alternatively, a predetermined amount of time the network 40 may send a message to the calling party 30 indicating the second call cannot be established. The reestablishment information previously stored in the communication device 20 of the calling party 30 may be deleted in response to the message from the network 40 indicating the second call cannot be established. For example, a timer having a desired, or alternatively a predetermined time at the network 40 may begin to run after the network 40 sends the call received message to the called party 50, and if the timer expires the network 40 may send the message to the calling party 30 indicating the call cannot be established.

Alternatively, the calling party 30 may not accept the deactivate-hibernated message, and the calling party 30 may send a message to the network 40 indicating non-acceptance of the deactivate-hibernated message. The reestablishment information previously stored in the communication device 20 of the calling party 30 may be deleted if the calling party 30 does not accept the deactivate-hibernated message. The network 40 may send a message to the called party 50 indicating the calling party 30 does not accept the deactivate-hibernated message. The reestablishment information previously stored in the communication device 20 of the called party 50 may be deleted in response to the message from the network 40 indicating the calling party 30 does not accept the deactivate-hibernated message.

In another example embodiment, the communication devices 20 of the calling party 30 and the called party 50 may include hibernate self-kill timers. For example, the self-kill timer for the calling party 30 may delete the reestablishment information from the memory 26 of the communication device 20 of the calling party 30 after a desired, or alternatively, a predetermined amount of time so that the second call may not be established in response to the deactivate-hibernated message. For example, the self-kill timer for the calling party 30 may begin to run after the calling party 30 stores the reestablishment information included in the hibernate message. If the self-kill timer for the calling party 30 expires before the deactivate-hibernated message is received from the called party 50, the reestablishment information previously stored in the communication device 20 of the calling party 30 may be deleted so that the second call may not be established in response the deactivate-hibernated message. The calling party 30 may send a message to the network 40 indicating the expiration of the self-kill timer.

Similarly, the self-kill timer for the called party 50 may begin to run after the called party 50 stores the reestablishment information, but before the called party 50 sends the hibernate message. Accordingly, if after a desired, or alternatively, a predetermined amount of time the self-kill timer for the called party 50 expires, the reestablishment information previously stored in the communication device 20 of the called party 50 may be deleted so that the called party 50 may not send a deactivate-hibernated message including the reestablishment information to the calling party 30. The called party 50 may send a message to the network 40 indicating expiration of the self-kill timer. The network 40 may notify the calling party 30 the self-kill timer for the called party 50 is expired, and/or the reestablishment information previously stored in the communication device 20 of the calling party 30 may be deleted.

The self-kill timers in the communication devices 20 of the calling party 30 and the called party 50 may be configured so that the self-kill timer in the communication device 20 of the called party 50 expires before the self-kill timer in communication device 20 of the calling party 30. For example, the self-kill timer for the calling party 30 may be set to expire in the same amount of time as the self-kill timer for the called party 50.

Referring to FIG. 4, in another example embodiment the communication device 20 of the called party 50 may be a call center 60. For example, the call center 60 may include a plurality of the communication devices 20 connected to a central communication device. The central communication device may act as a network center or hub for the call center 60 and/or may be connected to the network 40. The call center 60 may receive any number of calls from the communication devices 20 of calling parties connected to the network 40. The call center 60 may maintain a list of calls from the calling parties in a call queue. The call center 60 may place some of the calls in the call queue in the hibernated state. For example, calls that may not be served in a desired, or alternatively, a predetermined amount of time or calls at a desired, or alternatively, a predetermined place in the queue may be placed in the hibernated state according to the method described above in example embodiments. Therefore, resources allocated to the calls which are placed in the hibernated state may be released by the network 40.

The call center 60 may maintain each hibernated call's place in the call queue or may maintain another queue, for example a hibernated queue, including the hibernated calls. If a hibernated call in one of the queues moves to a position in the queue where the hibernated call may be served in the desired, or alternatively, the predetermined amount of time or the position of the hibernated call in the queue is in a desired, or alternatively, a predetermined place in the queue where the call may be serviced, the call center 60 may send the deactivate-hibernated message to the calling party associated with the hibernated call.

Accordingly, a second call between the call center 60 and the calling party associated with the hibernated, queued call may be established by the network 40 in accordance with the method described above according to example embodiments. Upon receiving the second call from the calling party associated with the hibernated call, the call center 60 may place the second call in the call queue at a desired, or alternatively, a predetermined position, for example the call center may place the second call in a priority position in the call queue, or the call center may directly transfer the call to a transfer party.

For example, a called party 50 may transfer a call to a transfer party. For example, if the called party 50 is a party connected to the call center 60, the called party 50 may transfer the call to another party connected to the call center 60. However, example embodiments are not limited thereto, and the called party 50 may transfer the call to any party connected to the network 40.

If the called party 50 transfers the call to a transfer party the called party 50 may transfer information corresponding to the call to the transfer party. For example, the called party 50 may transfer information including the origination of the call, e.g., the calling party, what resources are needed for the call, and/or information corresponding to the call. The transfer party may become the called party 50 if the first call is transferred.

Accordingly, a first call between a calling party and a called party may be placed in a hibernated state in which a network releases resources allocated to the first call in response to a hibernate message including reestablishment information from the called party. Wastage of airtime, resources, and money may be reduced because the network need not maintain resources allocated to the first call. The network may not bill the calling party and/or the called party for time and/or resources related to the first call after the first call is placed in the hibernated state. If a second call between the calling party and the called party is established, the network may charge an appropriate party associated with the second call because the second call may be reestablished by an origination message from the calling party sent in response to a deactivate-hibernated message including the reestablishment information from the called party. Therefore, the called party may send the deactivate-hibernated message including the reestablishment information to the calling party to establish the second call, and the called party need not send an origination message to the calling party to establish the second call. The calling party may verify the called party through the use of the reestablishment information. Accordingly, the called party may not be billed for the second call initiated in response to the deactivate-hibernated message, and/or the calling party may not be charged for airtime or resources for the first call after the first call is placed in the hibernated state.

Although example embodiments have been shown and described in this specification and figures, it would be appreciated by those skilled in the art that changes may be made to the illustrated and/or described example embodiments without departing from their principles and spirit.

What is claimed:

1. A call hibernation method for a network, the method comprising:
    releasing resources allocated to a first call between a calling party and a called party in response to a hibernate message from the called party, the hibernate message indicating to hibernate the first call, the hibernate message including reestablishment information for reestablishing communication between the calling party and the called party, the reestablishment information stored with the calling party; and
    establishing a second call between the calling party and the called party in response to a deactivate-hibernated message from the called party, the deactivate-hibernated message indicating the called party desires to reestablish communication with the calling party, the deactivate-hibernated message including at least a portion of the reestablishment information.

2. The call hibernation method of claim 1, wherein the releasing resources step is performed if an acknowledgement response is received from the calling party indicating the calling party has stored at least a portion of the reestablishment information included in the hibernate message.

3. The call hibernation method of claim 2, wherein the establishing a second call step is performed if a call origination message is received from the calling party indicating the at least a portion of the reestablishment information included in the deactivate-hibernated message matches the at least a portion of the reestablishment information stored by the calling party.

4. The call hibernation method of 1, wherein the reestablishment information includes a unique key.

5. The call hibernation method of claim 4, wherein the unique key is a unique telephone number of the called party.

6. The call hibernation method of claim 4, wherein the called party and the calling part are at least one of a mobile terminal and a landline terminal.

7. The call hibernation method of claim 1, wherein the releasing resources step includes,
    receiving the hibernate message from the called party;
    forwarding the hibernate message to the calling party;
    receiving an acknowledgement response from the calling party in response to the hibernate message; and releasing resources allocated to the first call between the calling party and the called party in response to the acknowledgement response.

8. The call hibernation method of claim 1, wherein the establishing a second call step includes,
receiving the deactivate-hibernated message from the called party;
forwarding the deactivate-hibernated message to the calling party;
receiving a call origination message from the calling party in response to the deactivate-hibernated message;
sending a call received message to the called party in response to the call origination message;
receiving an acknowledgement response from the called party in response to the called received message; and
establishing the second call between the calling party and the called party in response to the acknowledgement response.

9. A call hibernation method for a calling party, the method comprising:
sending a first acknowledgement response to a network in response to a hibernate message, the hibernate message indicating to hibernate the first call, the hibernate message including reestablishment information for reestablishing communication with the called party, the reestablishment information stored with the calling party; and
sending a call origination message to the network in response to a deactivate-hibernated message to establish a second call with the called party, the deactivate-hibernated message indicating the called party desires to reestablish communication, the deactivate-hibernated message including at least a portion of the reestablishment information.

10. The call hibernation method of claim 9, further comprising:
storing at least a portion of the reestablishment information included in the hibernate message.

11. The call hibernation method of claim 10, further comprising:
deleting the stored at least a portion of the reestablishment information after the expiration of a self-kill timer, the self-kill timer beginning to run after the at least a portion of the reestablishment information included in the hibernate message is stored.

12. The call hibernation method of claim 10, further comprising:
comparing the stored at least a portion of the reestablishment information with the at least a portion of the reestablishment information included in the deactivate-hibernated request, and wherein
the sending step sends the call origination message to the network step if the stored at least a portion of the reestablishment information matches the at least a portion of the reestablishment information included in the deactivate-hibernated request.

13. A call hibernation method for a called party, the method comprising:
sending a hibernate message to a calling party to release resources allocated by a network to a first call with the calling party, the hibernate message indicating to hibernate the first call, the hibernate message including reestablishment information for reestablishing communication with the calling party, the reestablishment information stored with the calling party; and
sending a deactivate-hibernated message to the calling party to establish a second call with the calling party, the deactivate-hibernated message indicating a desire to reestablish communication with the calling party, the deactivate-hibernated message including at least a portion of the reestablishment information.

14. The call hibernation method of claim 13, further comprising:
storing the at least a portion of the reestablishment information before sending the hibernate message.

15. The call hibernation message of claim 14, further comprising:
deleting the stored at least a portion of the reestablishment information after the expiration of a self-kill timer, the self-kill timer beginning to run after the at least a portion of the reestablishment information is stored.

16. The call hibernation method of claim 13, wherein the sending a hibernate message step is performed in response to putting the first call in a hold state.

17. The call hibernation method of 16, wherein the sending a hibernate message step is performed in response to the expiration of a first timer, the first timer beginning to run after the first call is put in the hold state.

18. The call hibernation method of claim 13, further comprising:
maintaining a call queue including a plurality of hibernated calls from a plurality of calling parties;
queuing the first call in the call queue after the resources allocated by the network to the first call are released; and
performing the sending the deactivate-hibernated message step if the first call reaches a position in the queue such that the first call will no longer be hibernated.

19. The call hibernation method of claim 13, further comprising:
transferring the first call to a transfer party; and
sending the at least a portion of the reestablishment information in information corresponding to the first call to the transfer party immediately after transferring the first call to the transfer party.

20. The call hibernation method of claim 13, further comprising:
sending the reestablishment information to the calling party immediately after the first call is established by the network.

* * * * *